(12) United States Patent
White et al.

(10) Patent No.: US 8,516,561 B2
(45) Date of Patent: Aug. 20, 2013

(54) METHODS AND APPARATUS FOR DETERMINING USER AUTHORIZATION FROM MOTION OF A GESTURE-BASED CONTROL UNIT

(75) Inventors: Scott White, Austin, TX (US); James Cansler, Pflugerville, TX (US); Ian Schmehl, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1192 days.

(21) Appl. No.: 12/240,507

(22) Filed: Sep. 29, 2008

(65) Prior Publication Data

US 2010/0083373 A1    Apr. 1, 2010

(51) Int. Cl.
*G06F 21/00* (2006.01)
*H04L 9/32* (2006.01)

(52) U.S. Cl.
USPC ........... 726/7; 726/6; 726/18; 726/19; 726/27

(58) Field of Classification Search
None
See application file for complete search history.

(56) References Cited

U.S. PATENT DOCUMENTS

| | | | |
|---|---|---|---|
| 5,097,252 A | | 3/1992 | Harvill et al. |
| 5,559,961 A | * | 9/1996 | Blonder ........................ 726/18 |
| 5,757,360 A | | 5/1998 | Nitta et al. |
| 5,821,933 A | * | 10/1998 | Keller et al. .................. 715/741 |
| 6,192,478 B1 | * | 2/2001 | Elledge ............................ 726/18 |
| 6,421,453 B1 | * | 7/2002 | Kanevsky et al. ............. 382/115 |
| 6,681,031 B2 | | 1/2004 | Cohen et al. |
| 6,747,632 B2 | | 6/2004 | Howard |
| 6,950,534 B2 | | 9/2005 | Cohen et al. |
| 6,993,157 B1 | * | 1/2006 | Oue et al. ...................... 382/103 |
| 7,000,200 B1 | | 2/2006 | Martins |
| 7,158,038 B2 | * | 1/2007 | Fujie .......................... 340/573.4 |
| 7,173,604 B2 | | 2/2007 | Marvit et al. |
| 7,180,500 B2 | | 2/2007 | Marvit et al. |
| 7,240,367 B2 | * | 7/2007 | Park ................................ 726/18 |
| 7,636,855 B2 | * | 12/2009 | Applebaum et al. .......... 713/186 |
| 2003/0028784 A1 | * | 2/2003 | Uchida ......................... 713/186 |
| 2005/0179553 A1 | * | 8/2005 | Fujie .......................... 340/573.4 |
| 2006/0101281 A1 | * | 5/2006 | Zhang et al. .................. 713/186 |
| 2007/0259716 A1 | | 11/2007 | Mattice et al. |
| 2007/0259717 A1 | | 11/2007 | Mattice et al. |
| 2008/0170776 A1 | * | 7/2008 | Albertson et al. ............. 382/154 |
| 2009/0284344 A1 | * | 11/2009 | Craymer et al. ............. 340/5.54 |
| 2010/0295781 A1 | * | 11/2010 | Alameh et al. ................ 345/158 |

\* cited by examiner

*Primary Examiner* — Christopher Revak (74) *Attorney, Agent, or Firm* — Hanley, Flight & Zimmerman, LLC (57) ABSTRACT

Methods and apparatus for determining user authorization from motion of a gesture-based control unit are disclosed. An example method to determine user authorization from motion of a gesture-based control unit disclosed herein comprises detecting motion of the gesture-based control unit, the motion caused by a user, determining a detected gesture from a sequence of one or more detected motions of the gesture-based control unit, and identifying the user from the detected gesture to determine an authorization for use by the gesture-based control unit.

22 Claims, 8 Drawing Sheets

METHODS AND APPARATUS FOR DETERMINING USER AUTHORIZATION FROM MOTION OF A GESTURE-BASED CONTROL UNIT

FIELD OF THE DISCLOSURE

This disclosure relates generally to user authorization and, more particularly, to methods and apparatus for determining user authorization from motion of a gesture-based control unit.

BACKGROUND

Many modern systems and devices employ user authorization techniques to prevent access/use by unauthorized users and potentially to restrict access/use by certain authorized users. For example, many computer systems and computer applications perform user identification requiring a user to enter a username and password to gain authorized access to the system or application. Similarly, some electronic devices perform user identification requiring a user to enter an access code or other identification information to be authorized to use the device. These user authorization techniques are similar in that they require the user to perform some separate user identification operation (e.g., username and password entry, access code entry, etc.) distinct from the user's normal operation of the underlying system, application, device, etc. Furthermore, conventional user authorization techniques based on biometrics typically also can require the user to perform some separate user identification operation (e.g., speaking an access phrase into the microphone, placing a finger on the fingerprint reader, etc.). Conventional biometric user authorization techniques may further require the inclusion of special input component(s) (e.g., such as a microphone for voice analysis, a fingerprint reader for fingerprint analysis, etc.) in addition to the standard input component(s) already present and used by the underlying system, application, device, etc.

DETAILED DESCRIPTION

Example methods and apparatus to determine user authorization from motion of a gesture-based control unit are disclosed herein. A gesture-based control unit allows a user to control (e.g., operate) a particular controlled device by performing one or more gestures with the gesture-based control unit. For example, the gesture-based control unit may be a handheld device configured to detect motion, convert the detected motion to a detected gesture including a sequence of detected motions, and then output a command corresponding to the detected gesture for receipt by the controlled device. The controlled device may be, for example, any type of consumer, commercial or industrial electronic device or equipment, any type of computing or processing device, etc.

In the context of a gesture-based control unit, the example user authorization methods and apparatus described herein allow a user of the gesture-based control unit to be authorized from the same gestures the user performs to control (e.g., operate) the controlled device with the gesture-based control unit. Thus, the user is not required to perform any user identification operations distinct from the user's normal operation of the gesture-based control unit. Furthermore, no special input components need to be added to the gesture-based control unit to perform user identification. Thus, the example user authorization methods and apparatus described herein allow a gesture-based control unit to utilize user identification to prevent unauthorized use/access and/or restrict authorized use/access without requiring any special user identification input components or any special user identification operations to be performed by a user.

Figure 1:
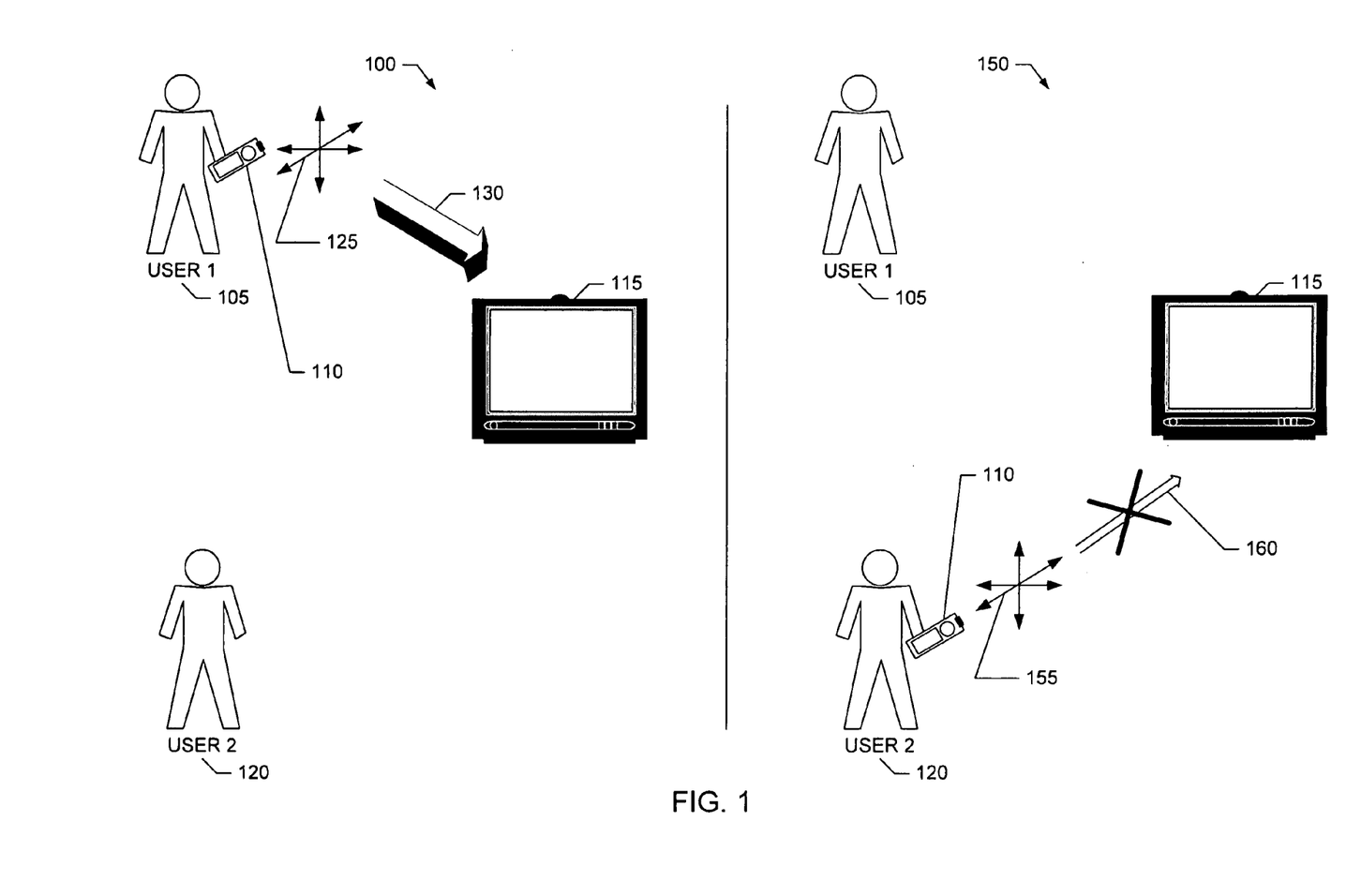
FIG. 1 is a block diagram illustrating example environments of use supporting user identification from motion of a gesture-based control unit.

Turning to the figures, a block diagram illustrating two example environments of use supporting user authorization from motion of a gesture-based control unit is illustrated in FIG. 1. In a first example environment of use 100, a first user 105 is shown operating an example gesture-based control unit 110 to control an example controlled device 115. A second user 120 is also shown.

In the illustrated example of FIG. 1, the gesture-based control unit 110 is depicted as a stand-alone handheld device configured to send commands wirelessly to the example controlled device 115. For example, the gesture-based control unit 110 may be configured to send commands in the form of radio frequency (RF) signals, infrared (IR) signals, ultrasonic signals, etc., for reception by the example controlled device 115. However, in other example implementations, the gesture-based control unit 110 may be configured to be coupled to the example controlled device 115 via a cabled/wired connection. Furthermore, in the illustrated example, the gesture-based control unit 110 is configurable (e.g., similar to a universal remote control) to replace a conventional remote control unit used to control the example controlled device 115. However, in other example implementations, the gesture-based control unit 110 may be implemented in part using a handheld device and in part by the example controlled device 115 itself. For example, the gesture-based control unit 110 could be implemented by a handheld device operable to send motion indications (discussed in greater detail below) to the example controlled device 115 which are then mappable by the example controlled device 115 to corresponding commands.

The example controlled device 115 is illustrated in the example of FIG. 1 as being a television set or similar multimedia device. However, in other example implementations, the controlled device 115 could be any type of consumer, commercial or industrial electronic device or equipment, any type of computing or processing device, etc. Furthermore, in the illustrated example, the controlled device 115 is depicted as being able to receive commands wirelessly from the example gesture-based control unit 110. For example, the controlled device 115 may be configured to receive commands in the form of radio frequency (RF) signals, infrared (IR) signals, ultrasonic signals, etc., from the example gesture-based control unit 110. However, in other example implementations, the controlled device 115 may be configured to be coupled to the example gesture-based control unit 110 via a cabled/wired connection.

In the first example environment of use 100, the first user 105 performs one or more gestures 125 with the example gesture-based control unit 110 to control (e.g., operate) the example controlled device 115. A gesture 125 is a sequence of one or more motions in one or more directions. In the illustrated example, the gesture-based control unit 110 is configured to support gestures 125 including motion in up to three (3) orthogonal directions. However, in other example implementations, the gesture-based control unit 110 could be configured to support gestures 125 including motion in fewer than three (3) orthogonal directions or any number of non-orthogonal directions.

As discussed in greater detail below, the example gesture-based control unit 110 operates to detect motion corresponding to one or more gestures 125 and determine detected gesture(s) representative of the detected motion. The example gesture-based control unit 110 then compares the detected gesture(s) to one or more gesture templates corresponding to known gestures. Each gesture template is mapped to one or more commands to be output/sent by the example gesture-based control unit 110. Additionally, each gesture template is mapped to user information associated with a particular user of the gesture-based control unit 110. If the detected gesture(s) match the gesture template(s), and the user information mapped to the matching gesture template(s) indicates the associated user is so authorized, the example gesture-based control unit 110 then outputs/sends one or more command signals 130 corresponding to the commands mapped to the matching gesture template(s). In the illustrated example, the gesture(s) 125 performed by the first user 105 is/(are) determined to match one or more gesture templates mapped to user information associated with the first user 105. In this example, the user information associated with the first user 105 indicates that the first user 105 is authorized to use the example gesture-based control unit 110. Thus, the example gesture-based control unit 110 outputs/sends the command signal(s) 130 to the example controlled device 115.

In an example operation, each gesture template is learned by the example gesture-based control unit 110 during a training mode in which a particular user performs a sequence of one or more motions which then form a reference gesture represented by the gesture template. As such, each gesture template represents a sequence of motions performed in a unique way by a particular user. Because it is unlikely that two different users will perform a sequence of motions in exactly the same way, a first user's manner of performing the particular sequence of motions is likely to match only the first user's gesture template and not a second user's gesture template representative of the particular sequence of motions. For example, two users attempting to perform a sequence of motions corresponding to a square are unlikely to move the example gesture-based control unit 110 along a square path having the same size, degree of squareness, etc. Furthermore, as the number of compared gestures increases, the likelihood of two different users performing the same sequences of motions decreases. Therefore, comparing detected gesture(s) corresponding to a sequence of motions performed by a particular user to gesture templates mapped to one or more known users can be used to uniquely identify the user from user information mapped to a matching gesture template.

Returning to FIG. 1, a second example environment of use 150 is also shown in which the second user 120 is shown operating the example gesture-based control unit 110 to control (e.g., operate) the example controlled device 115. The first user 105 is also shown. In the second example environment of use 150, the second user 120 performs one or more gestures 155 with the example gesture-based control unit 110 to control (e.g., operate) the example controlled device 115. In the illustrated example, the gesture(s) 155 performed by the second user 120 in the second example environment of use 150 is/(are) determined to match one or gesture templates mapped to user information associated with the second user 120. However, unlike in the first example environment of use 100, the user information associated with the second user 120 in the second example environment of user 150 indicates that the second user 120 is not authorized to use the example gesture-based control unit 110. (In an alternative example, the gesture(s) 155 performed by the second user 120 could be determined to not match any gesture templates, thereby indicating that the second user 120 is unknown and, therefore, not authorized to use the example gesture-based control unit 110). Thus, because the second user 120 is determined to be an unauthorized user, the example gesture-based control unit 110 prevents any command signal(s) 160 from being output/sent to the example controlled device 115.

Figure 2:
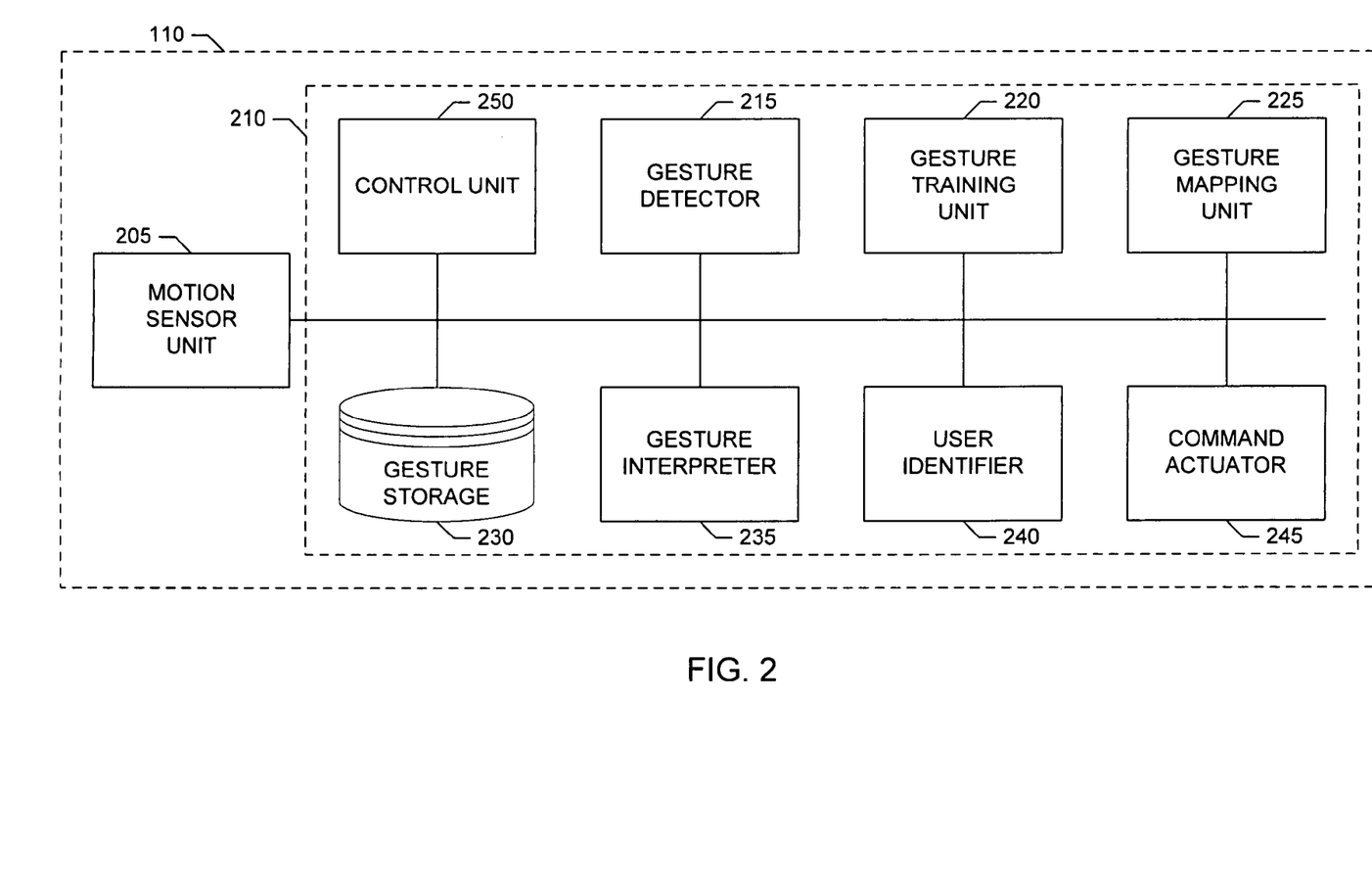
FIG. 2 is a block diagram of an example gesture-based control unit that may be used to perform user identification in the example environment of use of FIG. 1.

A block diagram of an example implementation of the example gesture-based control unit 110 of FIG. 1 is illustrated in FIG. 2. As described above, the example gesture-based control unit 110 of FIG. 2 operates to identify a user from the same gestures the user performs to cause the gesture-based control unit to perform some specific operation, such as outputting/sending one or more commands to the controlled device 115. Additionally, the example gesture-based control unit 110 of FIG. 2 operates to allow, prevent or restrict usage of the example gesture-based control unit 110 according to a user identification determined from the gestures performed by the user. Furthermore, the example gesture-based control unit 110 of FIG. 2 supports a training mode to allow the gesture-based control unit 110 to be trained to detect gestures corresponding to one or more particular users.

Turning to FIG. 2, the gesture-based control unit 110 of the illustrated example includes a motion sensor unit 205 having one or more motion sensors to detect motion of the gesture-based control unit 110. The motion sensors may be implemented by any sensors capable of sensing motion, such as accelerometers, gyroscopes, etc., or any combination thereof. In an example implementation, the motion sensor unit 205 includes three (3) motion sensors configured to sense motion in three (3) orthogonal directions. However, in other example implementations, the motion sensor unit 205 could include any number of motion sensors to detect motion in fewer than three (3) orthogonal directions or any number of non-orthogonal directions. The motion sensor unit 205 of the illustrated example is configured to output motion indications representative of the motion detected by the one or more motion sensors. For example, the motion indications may represent motion by specifying parameters including direction of the motion, speed and acceleration/deceleration of the motion, duration of the motion, etc.

The example gesture-based control unit 110 of FIG. 2 also includes a gesture processing device 210 to process the motion indications or information received from the example motion sensor unit 205. In the illustrated example, the gesture processing device 210 further includes a gesture detector 215 to detect gestures from the motion indications received from the example motion sensor unit 205. As described above, a gesture is a sequence of one or more motions in one or more directions. In an example implementation, the gesture detector 215 is configured to detect and indicate a start of a gesture and an end of a gesture. For example, the start of a gesture may correspond to the detection of an onset of motion and the end of a gesture may correspond to the absence of any further motion after some specified period of time, such as a timeout period. Additionally or alternatively, the start and/or end of a gesture may correspond to a predefined motion, such as a short jab characterized by a sudden change in motion.

The example gesture processing device 210 also includes a gesture training unit 220 to train the example gesture-based control unit 110 to detect gestures corresponding to one or more particular users. In particular, the example gesture training unit 220 implements a training mode in which gesture templates are determined, or "learned." As described above, each gesture template represents a particular sequence of motions making up a corresponding gesture. During the training mode, the example gesture training unit 220 forms a gesture template using one or motion indications received from the example motion sensor unit 205 and corresponding to a sequence of motion made by a particular user when performing the gesture undergoing training.

Additionally, the example gesture training unit 220 maps each determined gesture template to user information to associate with the particular user who performed the sequence of motions forming the gesture template. For example, the user information may include a user name, identification number, access code, etc., as well as access and/or usage authorization information. In an alternative example, no actual user information is mapped to the gesture template but, instead, the gesture template itself is used to imply that a user is authorized to use/access the example gesture-based control unit 110 when a detected gesture matches the learned gesture template.

In the illustrated example, the gesture training unit 220 also maps each determined gesture template to one or more commands to be actuated (e.g., output, sent, etc.) by the example gesture-based control unit 110 when a detected gesture matches the learned gesture template. In an example implementation, the gesture training unit 220 maps one or more generic (e.g., device independent) command identifiers to a particular gesture template, with each generic command identifier representing a particular command. Examples of generic command identifiers include device-independent alphanumeric identifiers indicating that corresponding device-dependent alphanumeric commands should be actuated by the example gesture-based control unit 110, device-independent channel and/or volume up/down identifiers indicating that corresponding device-dependent channel and/or volume up/down commands should be actuated by the example gesture-based control unit 110, etc.

The example gesture processing device 210 further includes a gesture mapping unit 225 to map gestures to a device-independent representation. The device-independent representation may correspond to a public or proprietary textual markup language, a public or proprietary binary language, etc. In the illustrated example, the gesture mapping unit 225 maps the gesture templates determined by the example gesture training unit 220 to the device-independent representation. Using a device-independent representation for the gesture templates allows the gesture templates to be easily ported among different devices, such as different gesture-based control units 110. Such porting allows, for example, efficient accumulation of gesture templates into gesture template libraries, offline analysis of gestures, etc. Additionally, the example gesture mapping unit 225 also maps detected gestures to the device-independent representation for comparison against gesture templates, as discussed in greater detail below.

To store the gesture templates determined by the example gesture training unit 220 and mapped to a device-independent representation by the example gesture mapping unit 225, the example gesture processing device 210 includes a gesture storage unit 230. The example gesture storage unit 230 may be implemented by any type of storage unit, memory device, memory element, database, etc., such as an example mass storage device 830 and/or an example volatile memory 818 of an example processing system 800 illustrated in FIG. 8 and discussed in greater detail below.

The example gesture processing device 210 further includes a gesture interpreter 235 to interpret one or more gestures performed by one or more users during normal operation of the example gesture-based control unit 110. In particular, the example gesture interpreter 235 determines a detected gesture from a one or more motion indications received from the example motion sensor unit 205 in response to a sequence of motions performed by a user during normal operation of the example gesture-based control unit 110. The example gesture interpreter 235 then compares the detected gesture to one or more gesture templates stored in the example gesture storage unit 230 to determine which, if any, learned gesture corresponds to the detected gesture. In the illustrated example, the gesture interpreter 235 invokes the gesture mapping unit 225 to map the detected gesture to a device independent representation to allow comparison with the device independent representation used for the stored gesture templates.

The example gesture interpreter 235 may use any type of comparison techniques to compare a detected gesture to a stored gesture template. For example, the gesture interpreter 235 may determine a distance metric or correlation value to represent how well the detected gesture matches the stored gesture template. Then, the example gesture interpreter 235 may choose the stored gesture template having the smallest distance or largest correlation value as the gesture template that matches the detected gesture. Additionally or alternatively, the example gesture interpreter 235 may utilize one or more thresholds which must be met by the distance metric or correlation value in order for the corresponding gesture template to be determined to match the detected gesture. In the illustrated example, the gesture interpreter 235 outputs an indication that the detected gesture is identifiable and has been interpreted to correspond to a stored gesture template when a match is detected, and that the detected gesture is unidentifiable when a match is not detected. If a match is detected, the example gesture interpreter 235 also identifies the matching gesture template.

The example gesture processing device 210 also includes a user identifier 240 to identify a user of the example gesture-based control unit 110. In the illustrated example, the user identifier 240 identifies the user of the example gesture-based control unit 110 from the user identification information mapped to a particular gesture template determined by the example gesture interpreter 235 to match a detected gesture corresponding to a sequence of motions performed by the user. The user identifier 240 of the illustrated example further processes the mapped user identification information to determine whether the user is authorized to use the example gesture-based control unit 110 and/or access the device being controlled (e.g., operated) by the example gesture-based control unit 110. Additionally, the example user identifier 240 may be configured to determine an identity of the user. The example user identifier 240 then outputs authorization and/or identity indications to be associated with the user of the example gesture-based control unit 110.

A command actuator 245 is included in the example gesture processing device 210 to actuate (e.g., output, send, etc.) one or more commands mapped to a gesture template determined by the example gesture interpreter 235 to match a detected gesture corresponding to a sequence of motions performed by a user of the example gesture-based control unit 110. Additionally, the example command actuator 245 conditions actuation of the one or more commands on one or more authorization indications associated with the user as provided by the example user identifier 240. In the illustrated example, the command actuator 245 processes the authorization and/or identity indications determined by the example user identifier 240 (from processing the user identification information mapped to a matching gesture template) to determine whether the associated user is authorized to use the example gesture-based control unit 110 and/or access the device being controlled by the example gesture-based control unit 110. If the user is so authorized, the command actuator 245 then actuates (e.g., outputs, sends, etc.) the one or more commands mapped to the matching gesture template.

In the illustrated example, one or more generic command identifiers are mapped to the matching gesture template. Thus, the example command actuator 245 operates to convert/translate the one or more generic command identifiers mapped to the matching gesture template to one or more corresponding device-dependent commands for actuation by the example gesture-based control unit 110. For example, the command actuator 245 may convert/translate the generic command identifier(s) to one or more RF, IR or ultrasonic command signals to be output/sent to a device being controlled by the gesture-based control unit 110 (e.g., such as the example controlled device 115).

In the illustrated example, the example gesture processing device 210 includes a control unit 250 to control operation of the various components/elements of the gesture processing device 210. For example, the control unit 250 is configured to the accept user inputs/selections to configure the example gesture processing device 210 to operate in a training mode or a normal operating mode. Additionally, the control unit 250 is configured to the accept user inputs/selections that provide user identification information and/or commands to be associated with particular gestures (e.g., to be mapped to particular gesture templates). Such user inputs/selections may be provided by a user through operation of a user interface implemented by the example gesture-based control unit 110, such as a keypad, touchscreen, etc. Additionally or alternatively, the user inputs/selections may be provided by one or more predefined motions corresponding to one or more predefined gesture templates.

In an example implementation, the motion sensor unit 205 and the gesture processing device 210 are integrated in a single handheld or similar device, such as remote control unit, a stylus, a wristwatch, a bracelet, etc. In another example implementation, the motion sensor unit 205 is implemented in the handheld device and the gesture processing device 210 is implemented in a processing device, such as a base unit, computer, etc., or even in the device to be controlled (e.g., operated) by the example gesture-based control unit 110. In yet another example implementation, the motion sensor unit 205 and the gesture processing device 210 are integrated into the controlled device itself, such as a mobile phone, personal digital assistant, etc., thus allowing a user to control the device through movement of the device itself.

While an example manner of implementing the example gesture-based control unit 110 of FIG. 1 has been illustrated in FIG. 2, one or more of the elements, processes and/or devices illustrated in FIG. 2 may be combined, divided, rearranged, omitted, eliminated and/or implemented in any other way. Further, the example motion sensor unit 205, the example gesture processing device 210, the example gesture detector 215, the example gesture training unit 220, the example gesture mapping unit 225, the example gesture storage unit 230, the example gesture interpreter 235, the example user identifier 240, the example command actuator 245, the example control unit 250 and/or, more generally, the example gesture-based control unit 110 of FIG. 2 may be implemented by hardware, software, firmware and/or any combination of hardware, software and/or firmware. Thus, for example, any of the example motion sensor unit 205, the example gesture processing device 210, the example gesture detector 215, the example gesture training unit 220, the example gesture mapping unit 225, the example gesture storage unit 230, the example gesture interpreter 235, the example user identifier 240, the example command actuator 245, the example control unit 250 and/or, more generally, the example gesture-based control unit 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example gesture-based control unit 110, the example motion sensor unit 205, the example gesture processing device 210, the example gesture detector 215, the example gesture training unit 220, the example gesture mapping unit 225, the example gesture storage unit 230, the example gesture interpreter 235, the example user identifier 240, the example command actuator 245 and/or the example control unit 250 are hereby expressly defined to include a tangible medium such as a memory, digital versatile disk (DVD), compact disk (CD), etc., storing such software and/or firmware. Further still, the example gesture-based control unit 110 of FIG. 2 may include one or more elements, processes and/or devices in addition to, or instead of, those illustrated in FIG. 2, and/or may include more than one of any or all of the illustrated elements, processes and devices.

Flowcharts representative of example machine readable instructions that may be executed to implement the example gesture-based control unit 110, the example motion sensor unit 205, the example gesture processing device 210, the example gesture detector 215, the example gesture training unit 220, the example gesture mapping unit 225, the example gesture storage unit 230, the example gesture interpreter 235, the example user identifier 240, the example command actuator 245 and/or the example control unit 250 are shown in FIGS. 3 through 7. In these examples, the machine readable instructions represented by each flowchart may comprise one or more programs for execution by: (a) a processor, such as a processor 812 shown in the example processing system 800 discussed below in connection with FIG. 8, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 812, but the entire program or programs and/or portions thereof could alternatively be executed by a device other than the processor 812 and/or embodied in firmware or dedicated hardware (e.g., implemented by an application specific integrated circuit (ASIC), a programmable logic device (PLD), a field programmable logic device (FPLD), discrete logic, etc.). For example, any or all of the example gesture-based control unit 110, the example motion sensor unit 205, the example gesture processing device 210, the example gesture detector 215, the example gesture training unit 220, the example gesture mapping unit 225, the example gesture storage unit 230, the example gesture interpreter 235, the example user identifier 240, the example command actuator 245 and/or the example control unit 250 could be implemented by any combination of software, hardware, and/or firmware. Also, some or all of the machine readable instructions represented by the flowchart of FIGS. 3 through 7 may, instead, be implemented manually. Further, although the example machine readable instructions are described with reference to the flowcharts illustrated in FIGS. 3 through 7, many other techniques for implementing the example methods and apparatus described herein may alternatively be used. For example, with reference to the flowcharts illustrated in FIGS. 3 through 7, the order of execution of the blocks may be changed, and/or some of the blocks described may be changed, eliminated, combined and/or subdivided into multiple blocks.

Figure 3:
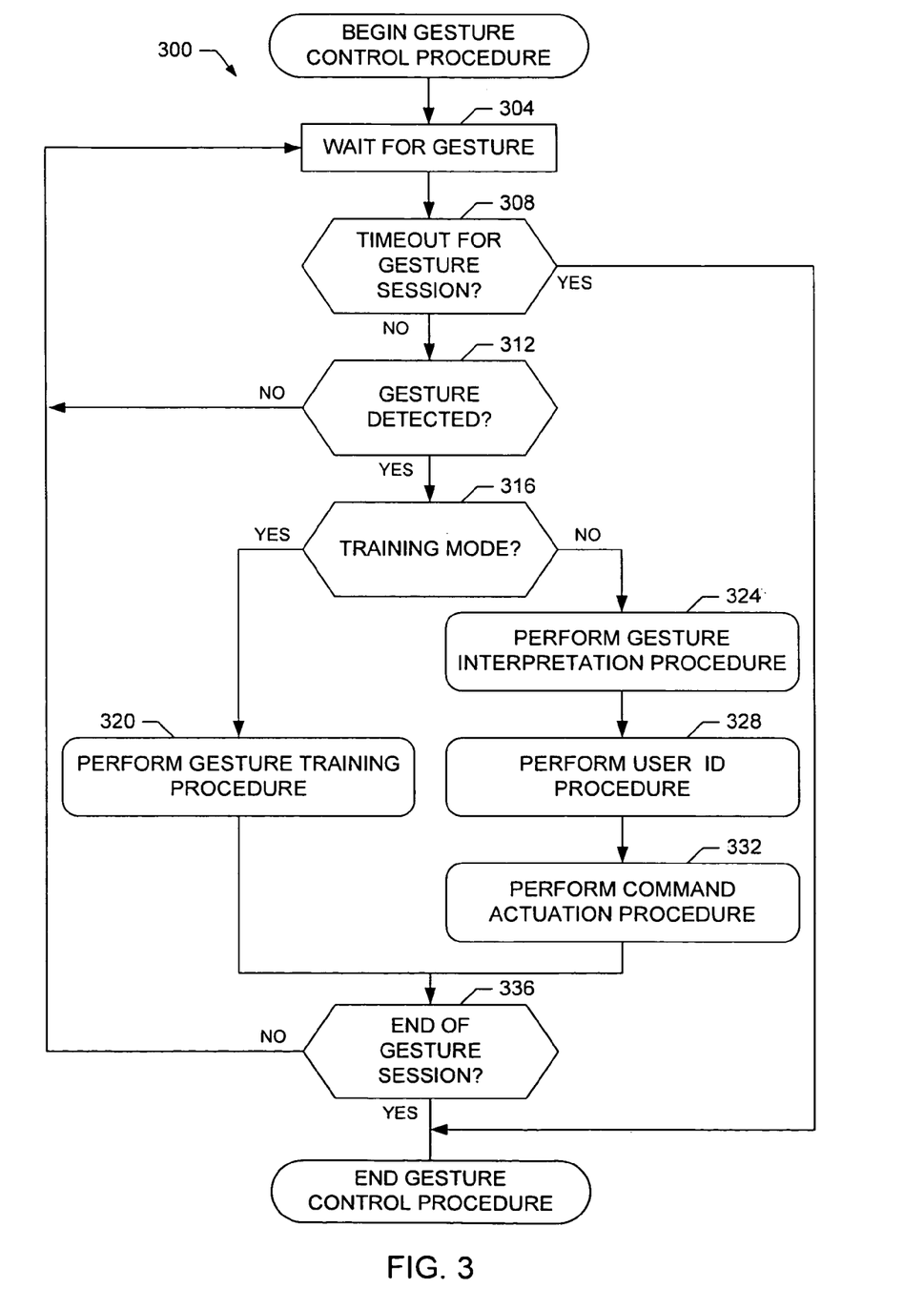
FIG. 3 is a flowchart representative of example machine readable instructions to perform gesture-based control that may be executed to implement the example gesture-based control unit of FIG. 2.

Example machine readable instructions 300 to perform gesture-based control processing that may be executed to implement the example gesture-based control unit 110 of FIGS. 1 and/or 2 are represented by the flowchart shown in FIG. 3. With reference to the example gesture-based control unit 110 illustrated in FIG. 2, the example machine readable instructions 300 of FIG. 3 begin execution at block 304 at which the example gesture detector 215 included in the example gesture-based control unit 110 waits for a gesture indicating the beginning of a gesture session. A gesture session is a sequence of gestures grouped together such that the time between gestures is within some specified timeout duration. For example, at block 304 the example gesture detector 215 may wait for motion indications from the example motion sensor unit 205 corresponding to a gesture performed by a user with the example gesture-based control unit 110.

Next, at block 308 the example gesture detector 215 determines whether a timeout duration allowed between detected gestures in a common gesture session has elapsed. If the timeout duration has elapsed (block 308), execution of the example machine readable instructions 300 ends for the current gesture session. The example machine readable instructions 300 may then be re-executed to perform gesture-based control processing for a subsequent sequence of gestures corresponding to a next gesture session.

However, if the timeout duration has not elapsed (block 308), control proceeds to block 312 at which the example gesture detector 215 determines whether a gesture has been detected. For example, at block 312 the example gesture detector 215 may determine whether motion indications corresponding to a gesture have been received from the example motion sensor unit 205. If a gesture has not been detected (block 312), control returns to block 304 at which the example gesture detector 215 continues waiting for a gesture.

However, if a gesture has been detected (block 312), control proceeds to block 316 at which the example gesture detector 215 determines whether the example gesture-based control unit 110 has been configured for training mode operation. For example, the control unit 250 may configure the example gesture-based control unit 110 in a training mode or a normal operating mode as described above.

Figure 4:
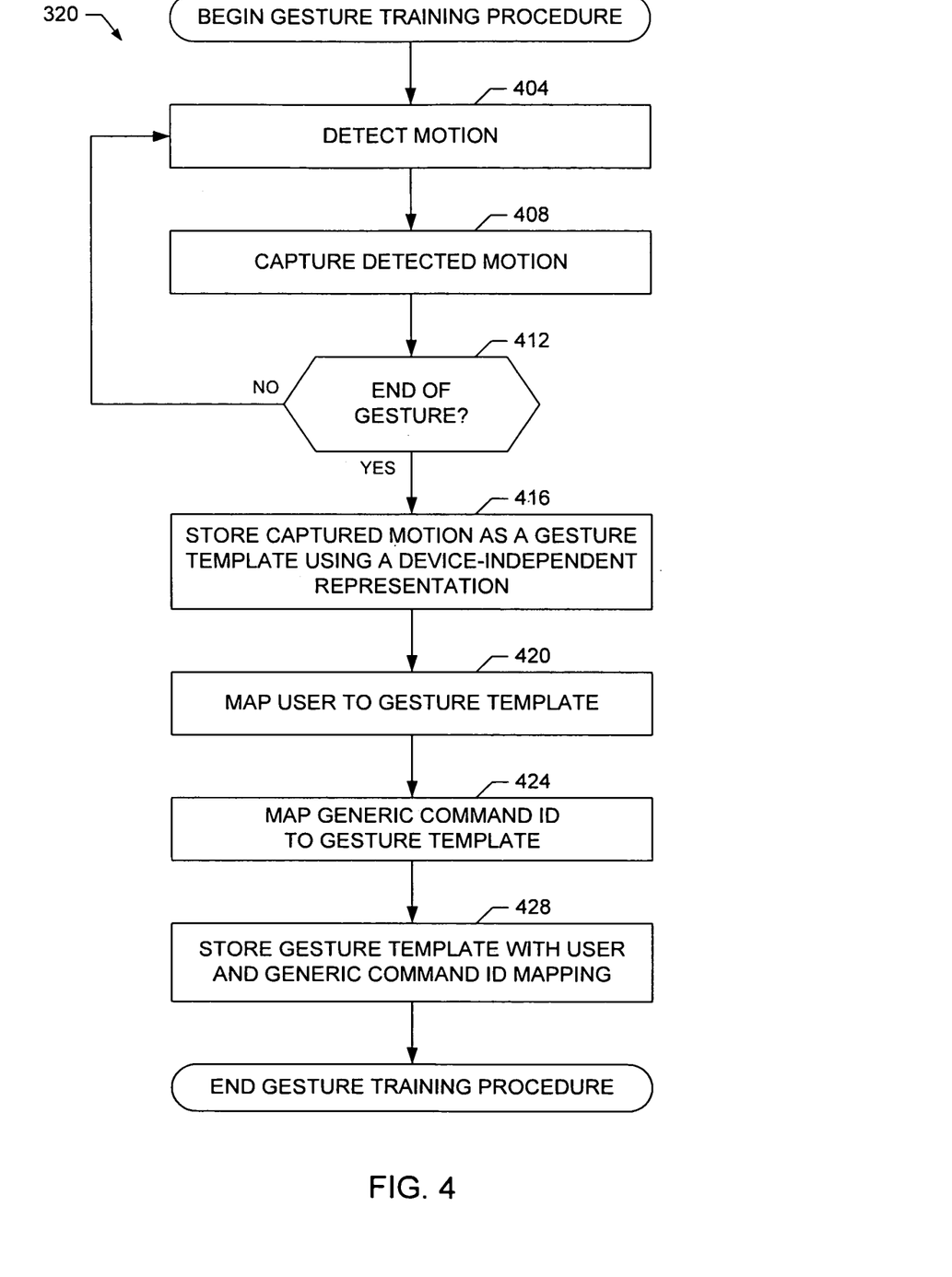
FIG. 4 is a flowchart representative of example machine readable instructions to perform gesture training that may be used to implement the example machine readable instructions of FIG. 3 and/or executed to implement the example gesture-based control unit of FIG. 2.

If the example gesture-based control unit 110 has been configured for training mode operation (block 316), control proceeds to block 320 at which the example gesture training unit 220 included in the example gesture-based control unit 110 implements a training mode to train the example gesture-based control unit 110 to detect gestures corresponding to one or more particular users. For example, at block 320 the example gesture training unit 220 determines one or more gesture templates from one or motion indications received from the example motion sensor unit 205 and corresponding to a particular sequence of motions made by a particular user when performing a particular gesture undergoing training. Example machine readable instructions that may be used to implement the processing at block 320 are illustrated in the flowchart of FIG. 4 and discussed in greater detail below.

Figure 5:
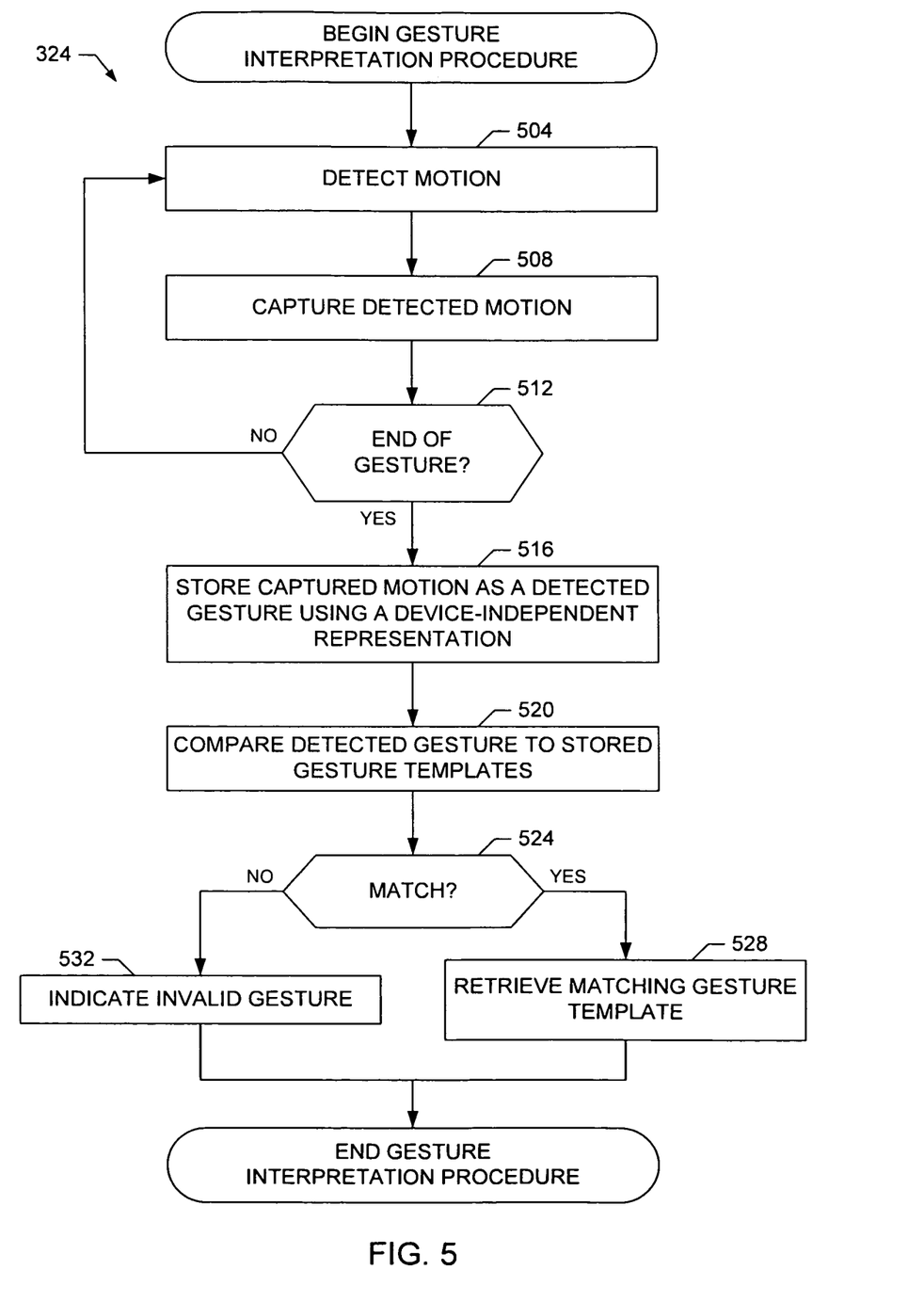
FIG. 5 is a flowchart representative of example machine readable instructions to perform gesture interpretation that may be used to implement the example machine readable instructions of FIG. 3 and/or executed to implement the example gesture-based control unit of FIG. 2.

If, however, the example gesture-based control unit 110 has not been configured for training mode operation (block 316) and, therefore, is configured for normal operation, control proceeds to block 324. At block 324, the example gesture interpreter 235 included in the example gesture-based control unit 110 performs a gesture interpretation procedure to interpret one or more gestures performed by a user during normal operation of the example gesture-based control unit 110. For example, at block 324 the example gesture interpreter 235 may determine a detected gesture from motion indications received from the example motion sensor unit 205 during normal operation. The example gesture interpreter 235 may then compare the detected gesture to one or more gesture templates determined, for example, via the processing performed at block 320. Example machine readable instructions that may be used to implement the processing at block 324 are illustrated in the flowchart of FIG. 5 and discussed in greater detail below.

Figure 6:
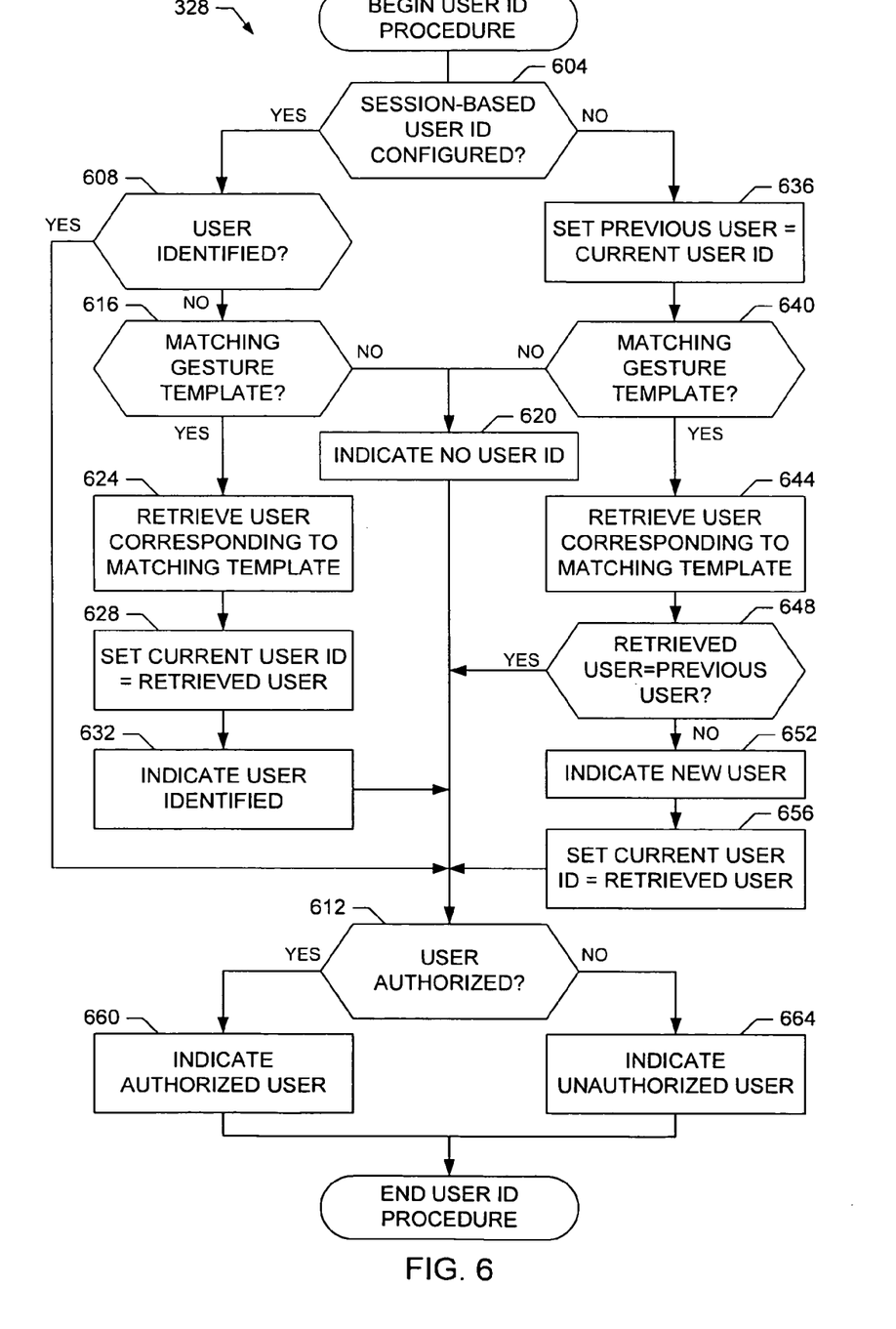
FIG. 6 is a flowchart representative of example machine readable instructions to perform user identification that may be used to implement the example machine readable instructions of FIG. 3 and/or executed to implement the example gesture-based control unit of FIG. 2.

Next, control proceeds to block 328 at which the example user identifier 240 included in the example gesture-based control unit 110 performs a user identification procedure to identify the user of the example gesture-based control unit 110. For example, at block 328 the user identifier 240 may process user identification information mapped to a gesture template determined by the processing at block 324 to match a detected gesture performed by the user. The user identification information may be processed at block 328 to determine an authorization and/or identity of the user. Example machine readable instructions that may be used to implement the processing at block 328 are illustrated in the flowchart of FIG. 6 and discussed in greater detail below.

Figure 7:
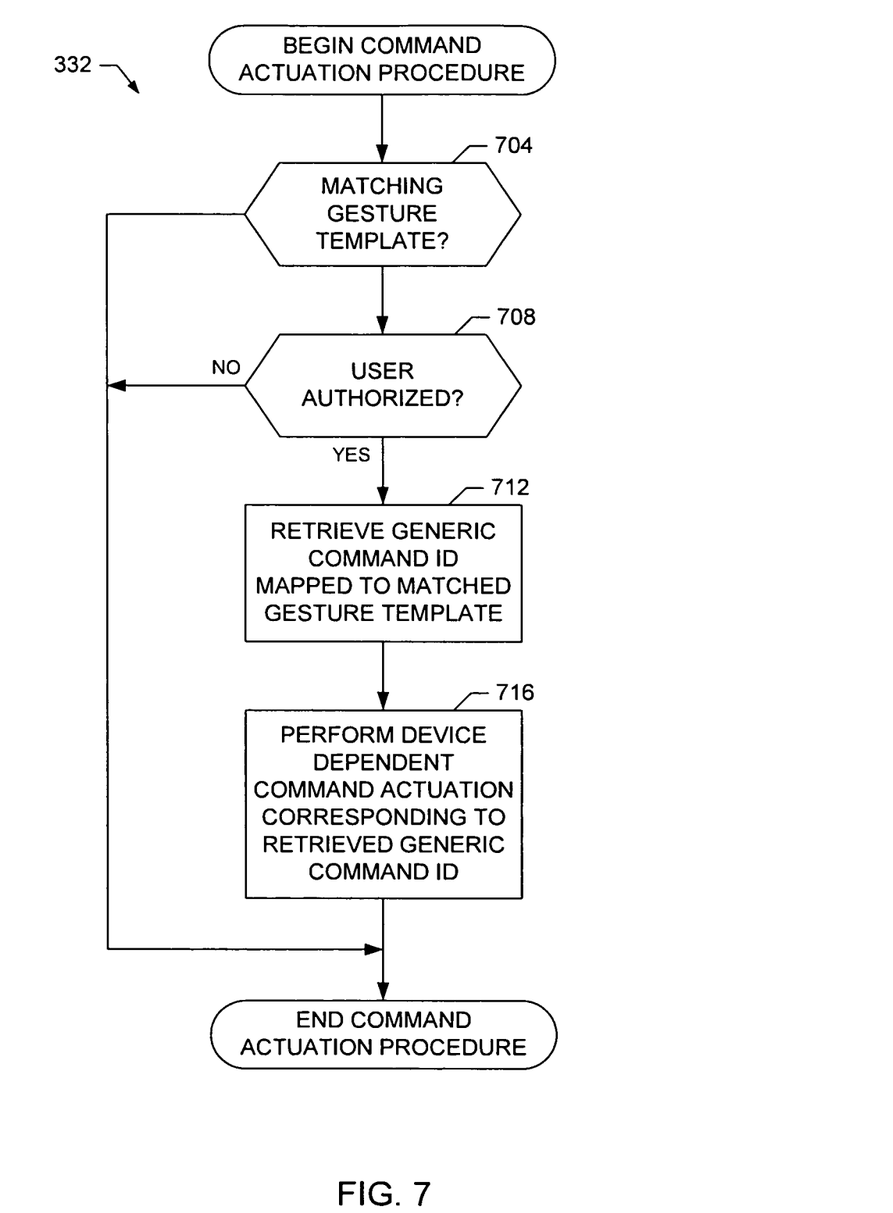
FIG. 7 is a flowchart representative of example machine readable instructions to perform command actuation that may be used to implement the example machine readable instructions of FIG. 3 and/or executed to implement the example gesture-based control unit of FIG. 2.

Next, control proceeds to block 332 at which the example command actuator 245 included in the example gesture-based control unit 110 performs a command actuation procedure to actuate (e.g., output, send, etc.) one or more commands corresponding to a detected gesture performed by a user of the example gesture-based control unit 110. For example, at block 332 the example command actuator 245 may determine whether the user is authorized to use the example gesture-based control unit 110 and/or access the device controlled by the example gesture-based control unit 110 from the authorization and/or identity information determined by the processing at block 328. If the user is so authorized, the example command actuator 245 may then output one or more commands corresponding to one or more command identifiers mapped to the gesture template determined by the processing at block 324 to match the detected gesture performed by the user. Example machine readable instructions that may be used to implement the processing at block 332 are illustrated in the flowchart of FIG. 7 and discussed in greater detail below.

After the processing at blocks 320 or 324 through 338 completes, control proceeds to block 336. At block 336, the example gesture detector 215 determines whether the current gesture session has ended. For example, at block 336 the example gesture detector 215 may determine that the end of the gesture session has occurred when the specified timeout duration between gestures of a common gesture session has elapsed, a particular gesture predefined to indicate the end of a gesture session has occurred, the example control unit 250 indicates that a user input/selection has been received indicating the end of the gesture session, etc. If the example gesture detector 215 determines the gesture session has not ended (block 336), control returns to block 304 at which the example gesture detector 215 waits for the next gesture. However, if the example gesture detector 215 determines the gesture session has ended (block 336), execution of the example machine readable instructions ends.

Example machine readable instructions 320 to perform an example gesture training procedure that may be used to implement the gesture training processing at block 320 of FIG. 3 and/or executed to implement at least portions of the example gesture-based control unit 110 of FIGS. 1 and/or 2 are represented by the flowchart shown in FIG. 4. With reference to the example gesture-based control unit 110 of FIG. 2, the example machine readable instructions 320 of FIG. 4 begin execution at block 404 at which the example gesture training unit 220 begins detecting motion in the form of motion indication(s) received from the example motion sensor unit 205. The detected motion corresponds to a gesture undergoing training and being learned by the example gesture-based control unit 110. Next, at block 408, the example gesture training unit 220 captures the detected motion by storing the received motion indication(s) for inclusion in a gesture template corresponding to the gesture undergoing training.

Control then proceeds to block 412 at which the example gesture training unit 220 determines whether a current gesture corresponding to a sequence of motions including the detected motion captured at bock 408 has ended. For example, at block 412 the example gesture training unit 220 may receive an end of gesture indication from the example gesture detector 215 when a predefined motion corresponding to the end of a gesture, such as a short jab characterized by a sudden change in motion, is detected. The example gesture detector 215 may also output an end of gesture indication when a specified timeout period has elapsed. If the example gesture training unit 220 determines that the current gesture has not ended (block 412), control returns to block 404 at which the example gesture training unit 220 continues detecting motion corresponding to the current gesture undergoing training. However, if the example gesture training unit 220 determines that the current gesture has ended (block 412), control proceeds to block 416.

At block 416, the example gesture training unit 220 invokes the example gesture mapping unit 225 to map the captured motion indications to a device independent representation for storage in a gesture template corresponding to the gesture undergoing training. For example, at block 416 the example gesture mapping unit 225 may convert the captured motion indications into a gesture template conforming to a public or proprietary textual markup language, a public or proprietary binary language, etc., capable of being transferred among different devices, such as different example gesture-based control units 110.

Control proceeds to block 420 after the device-independent representation of the sequence of motions making up the gesture undergoing training is stored in the corresponding gesture template at block 416. At block 420, the example gesture training unit 220 maps user information associated with the user performing the learned gesture to the gesture template corresponding to the learned gesture. For example, the user information mapped to the learned gesture template at block 420 may include a user name, identification number, access code, etc., as well as access and/or usage authorization information.

Next, control proceeds to block 424 at which the example gesture training unit 220 maps one or more generic (e.g., device independent) command identifiers to the learned gesture template. The one or more mapped command identifiers correspond to one or more commands to be actuated (e.g., output, sent, etc.) by the example gesture-based control unit 110 when a detected gesture matches the learned gesture template. Then, after processing at blocks 416 through 424 completes, control proceeds to block 428 at which the example gesture training unit 220 stores the learned gesture template with the corresponding mapping of user information and command identifier(s) in the example gesture storage unit 230. Execution of the example machine readable instructions 320 of FIG. 4 then ends.

Example machine readable instructions 324 to perform an example gesture interpretation procedure that may be used to implement the gesture interpretation processing at block 324 of FIG. 3 and/or executed to implement at least portions of the example gesture-based control unit 110 of FIGS. 1 and/or 2 are represented by the flowchart shown in FIG. 5. With reference to the example gesture-based control unit 110 of FIG. 2, the example machine readable instructions 324 of FIG. 5 begin execution at block 504 at which the example gesture interpreter 235 begins detecting motion in the form of motion indication(s) received from the example motion sensor unit 205. The detected motion corresponds to a gesture being performed by a user during normal operation of the example gesture-based control unit 110. Next, at block 508, the example gesture interpreter 235 captures the detected motion by storing the received motion indication(s) for inclusion in a detected gesture representative of the gesture being performed by the user during normal operation of the example gesture-based control unit 110.

Control then proceeds to block 512 at which the example gesture interpreter 235 determines whether a detected gesture corresponding to a sequence of motions including the detected motion captured at bock 508 has ended. For example, at block 512 the example gesture interpreter 235 may receive an end of gesture indication from the example gesture detector 215 when a predefined motion corresponding to the end of a gesture, such as a short jab characterized by a sudden change in motion, is detected. The example gesture detector 215 may also output an end of gesture indication when a specified timeout period has elapsed. If the example gesture interpreter 235 determines that the detected gesture has not ended (block 512), control returns to block 504 at which the example gesture interpreter 235 continues detecting motion corresponding to the gesture being performed by the user. However, if the example gesture interpreter 235 determines that the detected gesture has ended (block 512), control proceeds to block 516.

At block 516, the example gesture interpreter 235 invokes the example gesture mapping unit 225 to map the captured motion indications included in the detected gesture into a device independent representation for comparison with one or more gesture templates stored in the example gesture storage unit 250. For example, at block 516 the example gesture mapping unit 225 may convert the captured motion indications into a detected gesture conforming to a public or proprietary textual markup language, a public or proprietary binary language, etc., capable of being compared with the stored gesture template(s).

Next, control proceeds to block 520 at which the example gesture interpreter 235 compares the detected gesture with the one or more gesture templates stored in the example gesture storage unit 250. For example, at block 520 the example gesture interpreter 235 may determine a distance metric or correlation value to represent how well the detected gesture matches each stored gesture template. Control then proceeds to block 524 at which the example gesture interpreter 235 determines whether the detected gesture matches any of the stored gesture templates. For example, at block 524 the example gesture interpreter 235 may choose the stored gesture template having the smallest distance or largest correlation value as the gesture template that matches the detected gesture. Additionally or alternatively, the example gesture interpreter 235 may utilize one or more thresholds which must be met by the distance metric or correlation value in order for a gesture template to be determined to match the detected gesture.

If the example gesture interpreter 235 determines that the detected gesture matches a stored gesture template (block 524), control proceeds to block 528 at which the example gesture interpreter 235 retrieves the matching gesture template. At block 528 the example gesture interpreter 235 may also output an indication that the detected gesture has been interpreted to correspond to the matching gesture template. However, if the example gesture interpreter 235 determines that the detected gesture does not match any stored gesture template (block 524), control proceeds to block 532 at which the example gesture interpreter 235 outputs an indication that the detected gesture is invalid and/or unidentifiable. After a matching determination is made at either block 528 or block 532, execution of the example machine readable instructions 324 of FIG. 5 then ends.

Example machine readable instructions 328 to perform an example user identification procedure that may be used to implement the user identification processing at block 328 of FIG. 3 and/or executed to implement at least portions of the example gesture-based control unit 110 of FIGS. 1 and/or 2 are represented by the flowchart shown in FIG. 6. With reference to the example gesture-based control unit 110 of FIG. 2, the example machine readable instructions 328 of FIG. 6 begin execution at block 604 at which the example user identifier 240 determines whether the example gesture-based control unit 110 is configured for session-based user identification. If the example gesture-based control unit 110 is configured for session-based user identification, then user identification is performed only once at the start of a sequence of gestures constituting a gesture session; otherwise, user identification is performed for each detected gesture.

If the example user identifier 240 determines that session-based user identification is configured (block 604), control proceeds to block 608 at which the example user identifier 240 determines whether the user for the current gesture session has already been identified. If the user has already been identified (block 608), control proceeds to block 612 at which user authorization is examined. However, if the user for the current gesture session has not been identified (block 608), control proceeds to block 616 at which the example user identifier 240 determines whether the example gesture interpreter 235 identified a gesture template that matched the current detected gesture being processed. If no matching gesture template was identified (block 616), control proceeds to block 620 at which the example user identifier 240 indicates that no user identification is possible for the current user of the example gesture-based control unit 110 or, in other words, the current user is unidentifiable. Control then proceeds to block 612 at which user authorization is examined (e.g., to determine whether unidentified users are authorized to use/access the example gesture-based control unit 110).

Returning to block 616, if a matching gesture template was identified by the example gesture interpreter 235, control proceeds to block 624 at which example user identifier 240 retrieves the user identification information mapped to the matching gesture template. As discussed above, the retrieved user identification information may include one or more of a user name, identification number, access code, etc., as well as access and/or usage authorization information. Next, control proceeds to block 628 at which the example user identifier 240 sets a current user identifier for the current gesture session to be the identity of the particular user corresponding to the retrieved user identification information. Control then proceeds to block 632 at which the example user identifier 240 indicates that the current user of the example gesture-based control unit 110 has been identified (e.g., at least for the current gesture session). Control then proceeds to block 612 at which user authorization is examined.

Returning to block 604, if the example user identifier 240 determines that session-based user identification is not configured, control proceeds to block 636 to allow the example user identifier 240 to perform user identification for each detected gesture. In particular, at block 636 the example user identifier 240 sets a previous user identifier to be the identity of the current (e.g., most recently identified) user of the example gesture-based control unit 110. Next control proceeds to block 640 at which the example user identifier 240 determines whether the example gesture interpreter 235 identified a gesture template that matched the current detected gesture being processed. If no matching gesture template was identified (block 640), control proceeds to block 620 at which the example user identifier 240 indicates that no user identification is possible for the current user of the example gesture-based control unit 110 or, in other words, the current user is unidentifiable. Control then proceeds to block 612 at which user authorization is examined (e.g., to determine whether unidentified users are authorized to use/access the example gesture-based control unit 110).

Returning to block 640, if a matching gesture template was identified by the example gesture interpreter 235, control proceeds to block 644 at which example user identifier 240 retrieves the user identification information mapped to the matching gesture template. Next, control proceeds to block 648 at which the example user identifier 240 determines whether the retrieved user information corresponds to the previous user identifier set at block 636 or, equivalently, whether the retrieved user information corresponds to the most recently identified user of the example gesture-based control unit 110. If the retrieved user information matches the previous user identifier (block 648), the currently identified user of the example gesture-based control unit 110 has not changed and control, therefore, proceeds to block 612 at which user authorization is examined.

However, if the retrieved user information does not match the previous user identifier (block 648), control proceeds to block 652 at which the example user identifier 240 indicates that the current detected gesture was performed by a new user of the example gesture-based control unit 110. Next, control proceeds to block 656 at which the example user identifier 240 sets a current user identifier for the current detected gesture to be the identity of the particular user corresponding to the retrieved user identification information. Control then proceeds to block 612 at which user authorization is examined.

At block 612, the example user identifier 240 processes the user identification information determined to be associated with the current user of the example gesture-based control unit 110 (e.g., as mapped to a gesture template matching a detected gesture performed by the user) to determine whether the current user is authorized to use the example gesture-based control unit 110 and/or access a device being controlled by the example gesture-based control unit 110. If the current user is determined to be so authorized (block 612), control proceeds to block 660 at which the example user identifier 240 indicates that the current user is an authorized user of the example gesture-based control unit 110. However, if the current user is determined to not be so authorized (block 612), control proceeds to block 664 at which the example user identifier 240 indicates that the current user is an unauthorized user of the example gesture-based control unit 110. After the authorization indication is determined at either block 660 or block 664, execution of the example machine readable instructions 328 of FIG. 6 ends.

Example machine readable instructions 332 to perform an example command actuation procedure that may be used to implement the command actuation processing at block 332 of FIG. 3 and/or executed to implement at least portions of the example gesture-based control unit 110 of FIGS. 1 and/or 2 are represented by the flowchart shown in FIG. 7. With reference to the example gesture-based control unit 110 of FIG. 2, the example machine readable instructions 332 of FIG. 7 begin execution at block 704 at which the example command actuator 245 determines whether the example gesture interpreter 235 identified a gesture template matching a current detected gesture performed by a user of the example gesture-based control unit 110. If the example command actuator 245 determines that no matching gesture template was identified by the example gesture interpreter 235 (block 704), execution of the example machine readable instructions 332 of FIG. 7 ends.

However, if the example command actuator 245 determines that a matching gesture template was identified by the example gesture interpreter 235 (block 704), control proceeds to block 708 at which the example command actuator 245 determines whether the example user identifier 240 has identified the current user of the example gesture-based control unit 110 to be an authorized user or an unauthorized user. As discussed above, the example user identifier 240 determines such authorization from the user identification information mapped to the matching gesture template identified by the example gesture interpreter 235. If the example command actuator 245 determines that the example user identifier 240 has identified the current user to be an unauthorized user (block 708), execution of the example machine readable instructions 332 of FIG. 7 ends.

However, if the example command actuator 245 determines that the example user identifier 240 has identified the current user to be an authorized user (block 708), control proceeds to block 712. At block 712, the example command actuator 245 retrieves one or more generic (e.g., device independent) command identifiers mapped to the matching gesture template identified by the example gesture interpreter 235. As discussed above, the one or more generic command identifiers mapped to a particular gesture template represent one or more commands to be actuated by the example gesture-based control unit 110 when a detected gesture matches the particular gesture template.

Next, control proceeds to block 716 at which the example command actuator 245 converts/translates the one or more generic command identifiers retrieved at block 712 to one or more corresponding device-dependent commands for actuation by the example gesture-based control unit 110. For example, at block 716 the command actuator 245 may convert/translate the retrieved generic command identifier(s) to one or more RF, IR or ultrasonic command signals to be output/sent to a device being controlled by the gesture-based control unit 110 (e.g., such as the example controlled device 115). After the device-dependent commands are actuated at block 716, execution of the example machine readable instructions 716 of FIG. 7 then ends.

Figure 8:
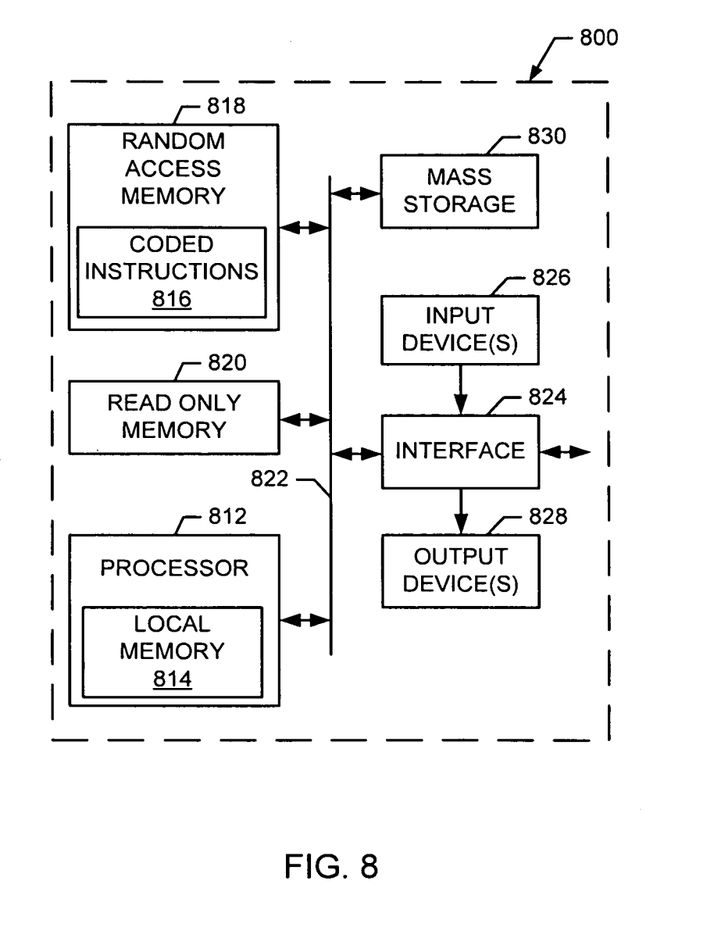
FIG. 8 is a block diagram of an example processing system that may execute the example machine readable instructions of FIGS. 3-6 and/or 7 to implement the example gesture-based control unit of FIG. 2.

FIG. 8 is a block diagram of the example processing system 800 capable of implementing the apparatus and methods disclosed herein. The processing system 800 can be, for example, a remote control device, a server, a personal computer, a personal digital assistant (PDA), an Internet appliance, a DVD player, a CD player, a digital video recorder, a personal video recorder, a set top box or any other type of computing device.

The system 800 of the instant example includes the processor 812. The processor 812 includes a local memory 814, and executes coded instructions 816 present in the local memory 814 and/or in another memory device. The processor 812 may execute, among other things, the machine readable instructions represented in FIG. 3 through FIG. 7. The processor 812 may be any type of digital signal processor (DSP), microcontroller, etc. Alternatively, the processor 812 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 812 is in communication with a main memory including the volatile memory 818 and a non-volatile memory 820 via a bus 822. The volatile memory 818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown).

The computer 800 also includes an interface circuit 824. The interface circuit 824 may implement any type of input/output (I/O) interface standard, such as an Ethernet interface, a universal serial bus (USB), and/or a third generation input/output (3GIO) interface. The interface circuit 824 also includes a communication device such as an RF transmitter, IR transmitter or ultrasonic transmitter to transmit command signals wirelessly to a controlled device, such as the example controlled device 115. The interface circuit 824 may also include other communication devices, such as a modem or network interface card to facilitate exchange of data with external computers via a network (e.g., an Ethernet connection, a digital subscriber line (DSL), a telephone line, coaxial cable, a cellular telephone system, etc.).

One or more input components/devices 826 may be connected to the interface circuit 824. The input component(s)/device(s) 826 permit a user to enter data and commands into the processor 812. The input device(s) can be implemented by, for example, a keypad, a keyboard, a mouse, a touch-screen, a track-pad, a trackball, an isopoint and/or a voice recognition system.

One or more output devices 828 may also connected to the interface circuit 824. The output devices 828 can be implemented, for example, by display devices (e.g., a liquid crystal display, a cathode ray tube display (CRT)), by a printer and/or by speakers. The interface circuit 824, thus, may include a graphics driver card.

The computer 800 may also include the one or more mass storage devices 830 for storing software and data. Examples of such mass storage devices 830 include floppy disk drives, hard drive disks, compact disk drives and digital versatile disk (DVD) drives. The mass storage device 830 may implement the example gesture storage unit 230. Alternatively, the volatile memory 818 may implement the example storage unit 230.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to determine user authorization from motion of a gesture-based control unit, the method comprising:
   detecting, at the gesture-based control unit, motion of the gesture-based control unit;
   determining, using a processor, a detected gesture from a detected sequence of one or more motions of the gesture-based control unit;
   identifying a user from the detected gesture to determine an authorization; and
   when the authorization indicates the user is authorized, actuating a command associated with the detected gesture.

2. The method as defined in claim 1, further comprising:
   capturing detected motion indications generated in response to the motion of the gesture-based control unit; and
   converting a detected sequence of one or more of the detected motion indications to a device independent representation to represent the detected gesture.

3. The method as defined in claim 1, further comprising:
   comparing the detected gesture to a gesture template mapped to a first user; and
   identifying the user to be the first user when the detected gesture is determined to match the gesture template.

4. The method as defined in claim 3, further comprising identifying the user to be an unknown user when the detected gesture is determined not to match the gesture template.

5. The method as defined in claim 3, further comprising:
   configuring the gesture-based control unit to operate in a training mode;
   capturing detected motion indications generated in response to detecting motion of the gesture-based control unit during the training mode; and
   converting a sequence of one or more detected motion indications to a device independent representation to store in the gesture template.

6. The method as defined in claim 3, further comprising:
   determining whether the first user is authorized to use the gesture-based control unit when the user is identified to be the first user; and
   performing a command actuation mapped to the gesture template when the first user is determined to be authorized to use the gesture-based control unit.

7. The method as defined in claim 1, further comprising:
   comparing the detected gesture to a first plurality of gesture templates mapped to a first user and a second plurality of gesture templates mapped to a second user; and
   identifying the user to be the first user and not the second user when the detected gesture is determined to match a first gesture template in the first plurality of gesture templates.

8. The method as defined in claim 7, wherein the detected gesture is a first detected gesture, and further comprising:
   determining a second detected gesture from a second sequence of one or more detected motions of the gesture-based control unit;
   comparing the second detected gesture to the first plurality of gesture templates mapped to the first user and the second plurality of gesture templates mapped to the second user; and
   identifying the user to be the second user and not the first user when the detected gesture is determined to match a second gesture template in the second plurality of gesture templates.

9. The method as defined in claim 7, wherein the detected gesture is a first detected gesture, and further comprising:
    determining a second detected gesture from a second sequence of one or more detected motions of the gesture-based control unit; and
    determining not to identify the user from the second detected gesture when the second gesture is determined to be included in a same gesture session as the first detected gesture and the user has already been identified from the first detected gesture.

10. The method as defined in claim 1, wherein user identification is performed for each detected gesture determined from the detected motion of the gesture-based control unit.

11. The method as defined in claim 1, wherein user identification is performed using only one detected gesture from a gesture session, the gesture session comprising a sequence of detected gestures.

12. A tangible machine readable storage device comprising machine readable instructions which, when executed, cause a machine to perform operations comprising:
    detecting, at a gesture-based control unit, motion of the gesture-based control unit;
    determining a detected gesture from a sequence of one or more detected motions of the gesture-based control unit;
    identifying a user from the detected gesture to determine an authorization; and
    when the authorization indicates the user is authorized, actuating a command associated with the detected gesture.

13. The machine readable storage device as defined in claim 12, wherein the operations performed by the machine further comprise:
    comparing the detected gesture to a first plurality of gesture templates mapped to a first user and a second plurality of gesture templates mapped to a second user;
    identifying the user to be the first user and not the second user when the detected gesture is determined to match a first gesture template in the first plurality of gesture templates; and
    identifying the user to be an unknown user when the detected gesture is determined not to match any gesture template in the first and second pluralities of gesture templates.

14. The tangible machine readable storage device as defined in claim 13, wherein the detected gesture is a first detected gesture, and the operations performed by the machine further comprise:
    determining a second detected gesture from a second sequence of one or more detected motions of the gesture-based control unit; and
    determining not to identify the user from the second detected gesture when the second gesture is determined to be included in a same gesture session as the first detected gesture and the user has already been identified from the first detected gesture.

15. An apparatus supporting user authorization, the apparatus comprising:
    a motion sensor to detect motion of the apparatus;
    a processor and a machine readable medium storing instructions which, when executed by the processor, cause the processor to perform operations comprising:
        determining a detected gesture from the motion detected by the motion sensor;
        comparing the detected gesture to a gesture template mapped to a command to be actuated by the apparatus;
        identifying a user from user identification information mapped to the gesture template when the processor determines the detected gesture matches the gesture template; and
        when the user identification information indicates the user is authorized, actuating a command associated with the gesture template.

16. The apparatus as defined in claim 15, wherein the operations further comprise determining a plurality of gesture templates for comparing with detected gestures, each gesture template in the plurality of gesture templates mapped to one user and at least one command to be actuated by the apparatus.

17. The apparatus as defined in claim 15, wherein the gesture template is mapped to a command identifier corresponding to the command to be actuated by the apparatus, and the operations further comprise:
    when the detected gesture is determined to match the gesture template, processing the user identification information mapped to the gesture template to determine whether the user is authorized to use the apparatus; and
    when the user is determined to be authorized to use the apparatus, performing a device dependent command actuation corresponding to the command identifier mapped to the gesture template.

18. The apparatus as defined in claim 17, wherein the operations further comprise preventing device dependent command actuations from being performed by the apparatus when (1) the user is not identifiable from the detected gesture or (2) the user is determined to not be authorized to use the apparatus.

19. A system supporting user authorization from motion, the system comprising:
    a remote control unit, the remote control unit further comprising a plurality of motion sensors to detect motion of the remote control unit in a plurality of different directions; and
    a gesture processing device to process motion indications received from the plurality of motion sensors, the gesture processing device comprising a processor and a machine readable medium comprising instructions which, when executed by the processor, cause the processor to perform operations comprising:
        determining a detected gesture from a sequence of one or more received motion indications;
        comparing the detected gesture to a plurality of gesture templates mapped to a plurality of commands to be actuated by the gesture processing device;
        identifying a user from user identification information mapped to a first gesture template from the plurality of gesture templates when the processor determines the detected gesture matches the first gesture template; and
        when the user identification information indicates the user is authorized, actuating a first command mapped to the first gesture template.

20. The system as defined in claim 19, wherein the remote control unit comprises the gesture processing device.

21. The system as defined in claim 19, further comprising a controlled device that is to respond to commands output by the gesture processing device.

22. The system as defined in claim 21, wherein the gesture processing device is to output the first command mapped to the first gesture template for receipt by the controlled device when the processor determines (1) the detected gesture matches the first gesture template and (2) the user identification information mapped to the first gesture template authorizes the user to at least one of use the remote control unit or access the controlled device.

* * * * *